United States Patent [19]

Fox

[11] Patent Number: 4,759,613
[45] Date of Patent: Jul. 26, 1988

[54] ACOUSTO-OPTIC MODULATOR
[75] Inventor: Alan J. Fox, Copthorne, England
[73] Assignee: U.S. Philips Corp., New York, N.Y.
[21] Appl. No.: 895,655
[22] Filed: Aug. 12, 1986
[30] Foreign Application Priority Data
  Aug. 19, 1985 [GB] United Kingdom ............... 8520706
[51] Int. Cl.⁴ ........................... G02F 1/11; G02F 1/33
[52] U.S. Cl. .................................................. 350/358
[58] Field of Search ....................... 350/358; 332/7.51
[56] References Cited
  U.S. PATENT DOCUMENTS
  3,419,322  8/1965  Adler ............................ 332/7.51 X
  3,771,856 11/1973  Eschler .............................. 350/358
  3,944,335  3/1976  Saito et al. ......................... 350/358
  4,624,534 11/1986  Amano ............................. 350/358

FOREIGN PATENT DOCUMENTS
  1401084  4/1975  United Kingdom .
  1401085 11/1975  United Kingdom .
  2119947 11/1983  United Kingdom .
  2175234  9/1986  United Kingdom .

OTHER PUBLICATIONS
Gordon, E. I. "A Review of Acoustooptical Deflection and Modulation Devices." Proc. IEEE, vol. 54, No. 10, pp. 1391–1401 (Oct. 1966).

Primary Examiner—Eugene R. Laroche
Assistant Examiner—Nathan W. McCutcheon
Attorney, Agent, or Firm—Thomas A. Briody; Jack E. Haken

[57] ABSTRACT

An acoustooptic modulator for generating a modulated diffracted beam 14 from a laser beam 10 by refractive Bragg diffraction from a longitudinal compressional acoustic wave directed into a germanium block 21 by a transducer 2.

By tilting the end face 26, 30, so that the angle of incidence is 44 degrees, all the acoustic wave energy is reflected as a shear wave S, at 27 degrees, and is then dissipated in layers 24 of lithium or lead on the upper and lower surfaces 19, 22, of the block. The end face 26 is also disposed obliquely in plan angle to further reduce retroreflection.

18 Claims, 4 Drawing Sheets

ACOUSTO-OPTIC MODULATOR

BACKGROUND OF THE INVENTION

The invention relates to an acousto-optic modulator for modulating a beam of optical radiation by interaction with acoustic waves in an acoustic medium in accordance with the Bragg relationship. The modulator comprises a block of material transparent to the optical radiation to be modulated and has respective opposite side faces of optical quality to provide input and output surfaces for a beam of said optical radiation. An end face is provided with electroacoustic transducer means for directing a beams of acoustic waves into said block to set up an interaction region for said beam of optical radiation between said input and output surfaces.

The operation of a modulator of the kind specified is discussed, for example, by E. I. Gordon in Proc. IEEE Vol. 54, October 1966, pages 1391–1401. FIG. 1 of the accompanying drawings is a diagram illustrating the principle of operation of such a modulator. A planar electroacoustic transducer 2, in the form of a piezoelectric wafer 3, formed for example from a monocrystal of lithium niobate, with upper and lower metallised electrodes 4 and 5, is mounted on one end face 6 of a block 1 of optically transparent material formed for example from a monocrystal of germanium. The transducer 2 is energised at a suitable high frequency, for example several MHz, causing a corresponding regular succession of parallel acoustic wavefronts, indicated by parallel lines 7, to propagate in the block as, for example, a longitudinal wave disturbance with the velocity $vL$ of a longitudinal acoustic acoustic wave in the direction indicated by the arrows 8. The associated local stress variations in the medium of the block will result in corresponding local variations in refractive index thus forming a corresponding diffraction structure which will propagate along the acoustic wave propagation path 9 in the direction 8.

A beam 10 of optical radiation to be modulated, in the present case coherent radiation generated by a laser (not shown), is directed via a lens 11 and an optical side face 12 of the block 1, across the path of the propagating acoustic wave 7 in an interaction region 13 at the Bragg angle $\theta_B$ with respect to the propagating wave structure 7, causing a diffracted beam 14 to be generated which is inclined at twice the Bragg angle $\theta_B$ to the direction of the input beam 10 in the interaction region 13. The amplitude of the diffracted beam 14 will depend on the amplitude of the acoustic wave 7, and therefore is used to form the modulated beam after passing out of the block 1 via the opposite optical side face 15. It should be noted herein that such a modulator can function equally well when non-coherent optical radiation is employed provided that the Bragg diffraction conditions are satisfied.

A difficulty with this form of modulator is that when the acoustic wave 7 reaches the far end face 16 of the block it will tend to be reflected, and some of the acoustic energy may then follow a retroreflective path back toward the transducer 2, as indicated by the arrows 17. As this reflected wave passes in the reverse direction through the interaction region 13 crossed by the beam of optical radiation 10, it may generate a weak diffracted beam but the direction of motion of the corresponding acoustic diffraction structure will be reversed relative to the optical beam and the original Bragg angle relationship will not be properly met. However, the reflected wave will continue to propagate until it reaches the transducer face 6 where some of the acoustic energy will be reflected as indicated by the arrows 18 so as to travel back in the initial propagation direction for which the Bragg relationship will be correct, and as it passes again through the interaction region 13, a corresponding delayed modulation signal will be imposed on the modulated beam 14, whose amplitude will depend on the amplitude of the reflected acoustic wave. The presence of this delayed signal whose delay will be that of the round trip of the acoustic wave via the various points of reflection, is undesirable and will adversely affect the performance of the modulator especially for data transmission and ranging.

In the paper referred to above, a modulator is illustrated in which the transverse far end wall of the block has a layer of acoustic absorber to reduce reflection, and this is also indicated in FIG. 1 by the reference 19. Examples of a suitable acoustic absorbing material in the case of a germanium block, are indium and lead although neither have the same acoustic impedance as germanium and the resulting impedance mismatch all generate a significant reflected signal which will be greater in the case of indium.

In order to reduce the direct mirror reflection from the far end face it has been proposed to incline the end face with respect to the acoustic wavefront so that the acoustic wave is reflected towards a non-optical side face of the block to which an acoustic absorbing layer, e.g. indium, has also been applied. In designing this wedge form of termination it was usual to avoid an inclination or wedge angle of 45 degrees for which it was though that the reflected incident acoustic wave would be directed perpendicularly at the side face thus providing an ideal retroreflective condition for generating an undesired return reflection. In practice, therefore, a wedge angle of about 30 degrees was employed so that acoustic energy which was not absorbed by the absorption layer on the inclined face, would undergo multiple absorptive reflections at the side faces of the block and thus be dissipated.

While some improvement has been achieved by this arrangement it has been found that the residual unwanted delayed modulation signal cannot be reduced to the extent required for some applications.

SUMMARY OF THE INVENTION

It is an object of the invention to provide an improved acousto-optic modulator in which return acoustic echos and resultant unwanted delay modulation signals can be reduced to very low amplitudes relative to the primary modulation signal.

According to the invention there is provided an acousto-optic modulator of the kind specified characterised in that the other end face of the block is free so as to form an optimally reflecting surface for incident acoustic waves, and is inclined to the initially propagating acoustic beam incident thereon directly from the transducer, at an angle such that substantially all the acoustic energy in the incident propagation mode is converted into reflected acoustic beam energy in a different propagation mode and is directed toward at least one side face of the block in a manner which is substantially not retroreflective with respect to the initially propagating acoustic beam incident on the inclined end face of the block.

In the course of realising the invention it was identified that the problem of unwanted reflected acoustical signal energy is caused in part by the presence of scatter centres in the acoustic absorbing layer, e.g. of indium, applied to the inclined end plane, which cause a direct reflection of acoustic energy to occur back toward the interaction region and the transducer, and in further part because when an acoustic wave having a given mode of propagation in a solid body, for example a longitudinal wave, is reflected at an inclined boundary surface, some acoustic energy is in general transferred to another mode, e.g. to form a shear wave. Because the different modes propagate with correspondingly different velocities, the angles of reflection of the two waves will differ thus increasing the likelihood that a significant amount of acoustic energy will be reflected retroactively back toward the transducer and the interaction region instead of being dissipated by multiple reflection at the side faces of the block. For example, in the case of a 30 degree wedge angle, although the longitudinal wave may be reflected so as to enable scattering to take place, the shear wave component will be reflected at an angle of about 30 degrees and will be directed more or less perpendicularly toward the side face of the block thus following an ideal retroreflective path.

The invention is based on the realization that by a suitable inclination of the far end face of the block it is possible to cause substantially the whole of the incident acoustic energy in a wave of one propagation mode, e.g., a longitudinal wave, to be converted into a wave of a different propagation mode, e.g. a shear wave, and furthermore that by removing the acoustic absorbing material and hence the associated scatter centres from the inclined end surface, a further significant reduction in the return acoustic signal energy can be effected. In fact, in the case of a longitudinal acoustic wave in a block of germanium it has been found that a wedge angle of about 45 degrees gives the smallest return wave, a surprising result since this angle could be expected to provide an ideal retroreflective path condition for such a wave.

In one form of acousto-optic modulator in accordance with the invention in which the block is formed from a crystal of germanium, the acoustic beam is launched by the transducer means in the longitudinal compression mode along the [100] crystal direction and the angle of inclination of the inclined end face to he propagation direction of the incident acoustic wave lies in the range 38 degrees to 50 degrss, and is preferably about 44 degrees.

In a further form of acousto-optic modulator in accordance with the invention in which the block is formed from a crystal of germanium, the acoustic beam is launched by the transducer means in the longitudinal compression mode along the [111] crystal direction, the incident coherent optical radiation to be modulated is polarised so that the electric vector lies in the plane containing the acoustic and optical beams, and the angle of inclination of the inclined end face to the propagation direction of the incident acoustic wave lies in the range 38 degrees to 50 degrees, and is preferably about 44 degrees.

In accordance with a feature of the invention, the edges respectively formed by the intersections of the inclined end face with the corresponding non-optical side faces of the block which are preferably loaded with an acoustic absorbing layer, can be inclined to the wavefront of the initially propagating acoustic wave beam, and this inclination preferably lies in the range 25 degrees to 35 degrees. The acoustic absorbing layer on the side faces of the block can comprise a layer of indium or a layer of lead.

An acousto-optic modulator manufactured in accordance with the invention can be employed in an optical ranging system for surveying or for radar, or as a modulator for optical communications.

DESCRIPTION OF THE PREFERRED EMBODIMENTS

Figure 1:
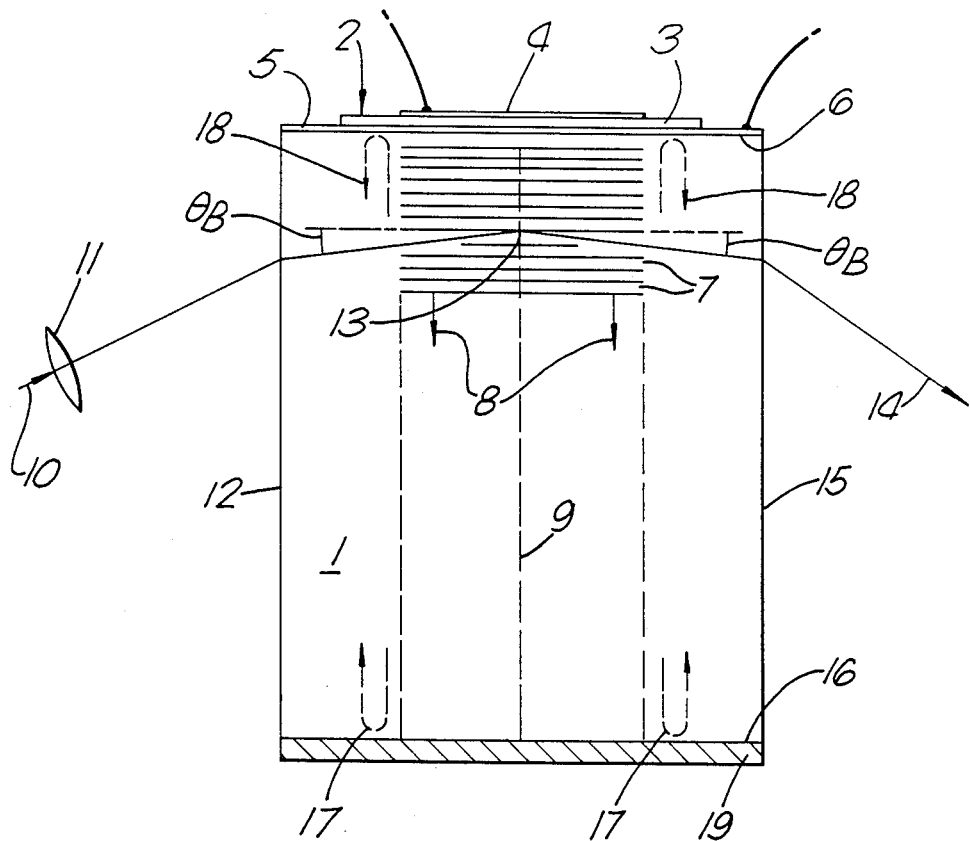
FIG. 1 is a prior art modulator.
Figure 2:
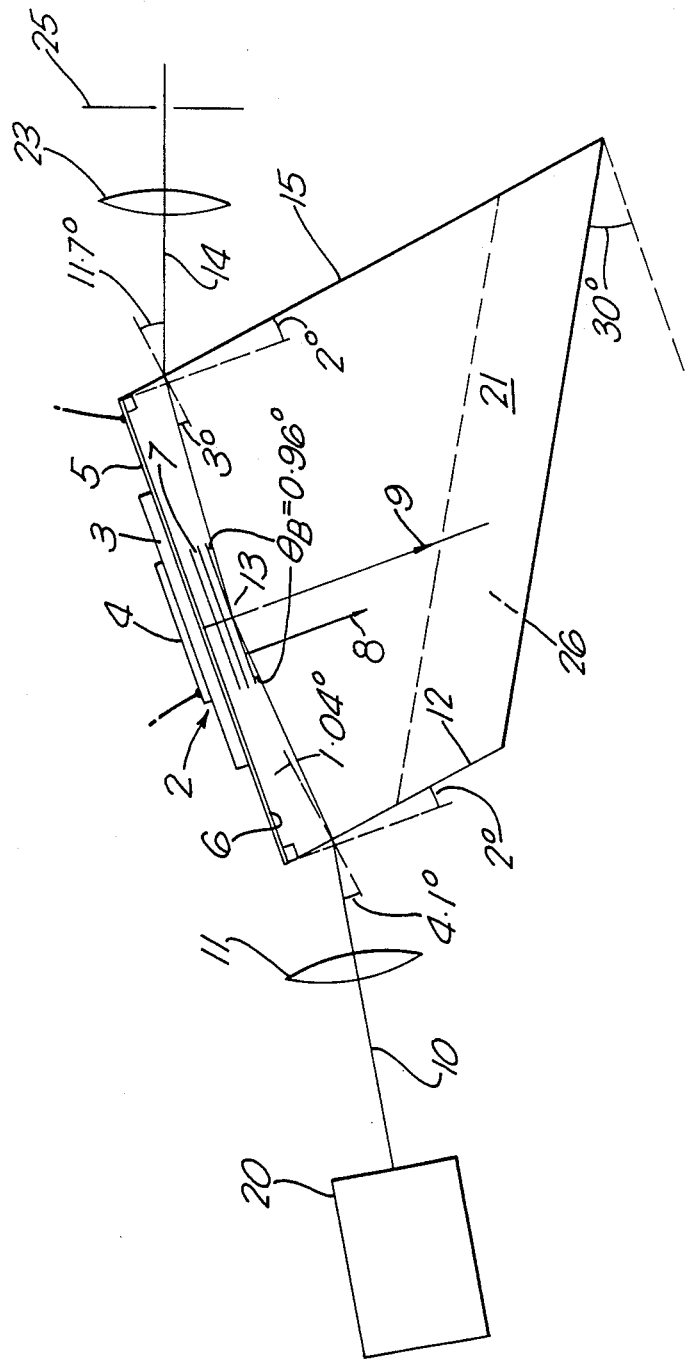
FIG. 2 diagrammatically illustrates an acousto-optic laser modulator arrangement in accordance with the invention.

Referring to FIG. 2 which illustrates an acousto-optic laser modulator arrangement in accordance with the invention, elements corresponding to those described with reference to FIG. 1 are given the same reference numerals. A $CO_2$ laser 20 provides a beam 10 of coherent optical radiation having a wavelength $\lambda = 10.6$ $\mu$m, and a diameter of about 2 mm. A germanium lens 11 is used to focus the beam so that in the interaction region 13, the beam has a waist with a minimum diameter of about 200 $\mu$m in order to provide the modulator with a short rise time. Because the optical beam is focussed in the present example, the divergence of the optical beam is preferably matched by a corresponding divergence of the acoustic beam in order to provide an optimally high modulation efficiency. If it is not important to provide a short rise time, the optical radiation need not take the form of a focussed beam but can, for example, comprise a normally collimated laser beam.

The modulator block 21 is formed from a monocrystal of germanium and in one example was of width 20 mm, thickness 5 mm and overall length about 22 mm. The transducer 2 comprised a wafer 3, 35 degree Y-cut from a monocrystal of lithium niobate and operating in the fundamental thickness mode, which is pressure bonded to the end face 6 of the block 21 by the method described in U.K. Patent Application No. 8510700. One of the electrodes, namely 5, comprises a conductive film made up of layers of chromium, gold and indium applied prior to pressure bonding. The other electrode 4, whose dimensions determine the active region of the transducer 2 and hence the initial cross section of the acoustic beam 7, is applied after lapping the bonded wafer 3 to the correct thickness for resonance at the required acoustic frequency. In the present example the transverse dimensions of the wafer 3 were 12 mm in the plane of FIG. 2 and 3 mm in the direction perpendicular thereto, the corresponding dimensions of the electrode 4 were 6 mm and 0.3 mm respectively.

The orientation of the block 21 relative to the germanium crystal axes will depend on the application of the modulator as follows. If the highest modulation efficiency is required and the use of plane polarised light is permissible, the block 21 is cut so that the acoustic wave propagation path direction 9 lies along the [111] crystal axis and the incident light must be polarised with the plane of the electric vector parallel to the acoustic wave propagation direction 9. If this use of plane polarised light is not acceptable, the block 21 is cut so that the acoustic wave propagation direction 9 lies along the [100] germanium crystal axis. In this case the polarisation plane direction is not critical and the device can operate with circularly polarised light, however the modulation sensitivity for two directions at right angles will, in general, be different and in the latter case the output will tend to become elliptically polarised.

In the case of the present modulator, the Bragg angle $\theta_B$ is given by:

$$\theta_B = \sin^{-1}(\lambda/2\Lambda)$$

where $\lambda$ is the optical wavelength in the acoustic medium and $\Lambda$ is the acoustic wavelength in the medium. Thus in the case of germanium, for which the refractive index n=4, the light from the $CO_2$ laser 20, whose free space wavelength $\lambda_o = 10.6$ μm, will have a wavelength $\lambda$ in the medium of 2.65 μm. The acoustic wavelength will depend of course on the frequency and on the acoustic velocity which latter will depend on direction. Thus, for example, an acoustic wave having a frequency of 60 MHz directed along the [100] axis for which the velocity of a longitudinal wave $V_L = 4.72 \times 10^3$ m/sec, will have a wavelength $\lambda = 78.7$ μm giving a value for the Bragg angle $\theta_B = 0.96$ degree. In a second example, an acoustic wave having a frequency of 100 MHz directed along the [111] direction for which $V_L = 5.5 \times 10^3$ m/sec, will have $\Lambda = 55$ μm giving a value for the Bragg angle $\theta_B = 1.38$ degrees.

In order to reduce optical reflection from the optical faces 12 and 15 of the block 21, the faces each provided with an anti-reflection layer. In the present example both faces, although parallel to one another, are inclined by 2 degrees from the acoustic wave propagation direction 9 which is perpendicular to the end face 6. This arrangement was employed in order to make the modulator block 21 readily interchangeable in a mount with other modulators for other frequencies or orientations. In general, however, it is preferable for the avoidance of reflections, that the faces 12 and 15 should not be parallel to one another. Because of the smallness of the inclination angles and of other ray angles, and for the sake of clarity of illustration, these angles are depicted in FIG. 2 with their magnitudes enlarged, especially within the block 21. FIG. 2 is intended to represent the case for which the Bragg angle is 0.96 degrees.

The modulator diffracted output beam 14, after refraction at the exit face 15 of the block, is directed along the modulator output axis and is collimated by a second germanium lens 23. An apertured diaphragm 25 is used to remove the undiffracted component of the emergent beam.

In order to reduce as far as possible any acoustic energy which can be reflected back along the acoustic propagation path 9, the far end face 26 of the block is, in accordance with the invention, inclined to the initial acoustic beam of wavefronts 7 launched by the transducer 2 and propagating along the axis 9 in the direction 8, at an angle such that substantially all the acoustic energy in the incident propagation mode, in the present example a longitudinal compression wave, is converted on reflection at the face 26 which is free of any surface loading, into reflected acoustic beam energy in a different propagation mode, in the present example a shear wave, and is directed toward the side faces of the block 21 in a manner which is substantially not retroreflective with respect to the initially propagating acoustic beam incident on the inclined end face 26 of the block 21.

Figure 3:
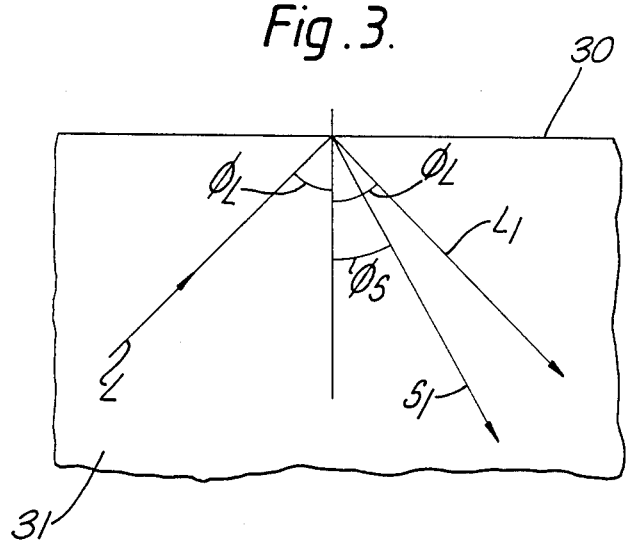
FIG. 3 is a diagram illustrating acoustic wave paths at a boundary.

In order to explain the invention reference is made to the ray diagram shown in FIG. 3. A longitudinal compression acoustic wave of amplitude L is directed in a solid acoustic medium 31 at a free boundary surface 30 at an angle of incidence $\phi_L$. A corresponding reflected longitudinal wave component $L_1$ would be reflected at an angle of reflection of the same magnitude $\phi_L$. Because the medium 31 is a rigid medium and the incident wave is inclined to the boundary surface, a shear wave component $S_1$ will also be formed and will be reflected at an angle of reflection $\phi_S$. A germanium crystal is an anisotropic acoustic medium, however, for ease of calculation an equivalent isotropic medium is assumed where the average values of the longitudinal and shear wave velocities are taken as $v_L = 5.56$ km/sec and $v_S = 3.55$ km/sec, respectively. Thus by the usual considerations of reflection, the reflection angles are related by the following:

$$\sin \phi_L / v_L = \sin \phi_S / v_S. \tag{1}$$

It can further be shown that for an acoustic wave of amplitude L incident at a solid/air interface where stresses perpendicular to the surface must be zero and the corresponding displacement can assume any value, the amplitudes of the reflected longitudinal and shear waves $L_1$ and $S_1$ are given by:

$$2(L-L_1)\sin \phi_S \cdot \cos \phi_L - S_1 \cdot \cos 2\phi_S = 0 \tag{2}$$

and $$(L+L_1)\sin\phi_L \cdot \cos 2\phi_S - S_1 \cdot \sin \phi_S \cdot \sin 2\phi_S = 0. \tag{3}$$

Equations (2) and (3) can be solved for the relative amplitudes $L_1/L$ and $S_1/L$ to yield $$\frac{L_1}{L} = \left| \frac{1-A}{1+A} \right| \tag{4}$$

where:

$$A = \frac{\tan\phi_L}{2\sin^2\phi_S \cdot \tan 2\phi_S} \tag{5}$$

and $$\frac{S_1}{L} = \frac{2\cos\phi_L \cdot \sin\phi_S}{\cos 2\phi_S} \left| 1 - \frac{L_1}{L} \right|$$

It will be apparent from equation (4) that the amplitude of the reflected longitudinal wave $L_1$ will become zero when $A=1$ and hence $$\tan \phi_L = 2 \sin^2 \phi_S \cdot \tan 2\phi_S. \tag{6}$$

Using the relationship (1) between $\phi_L$ and $\phi_S$ and the values given above for $v_L$ and $v_S$, it can be seen that $|L_1/L|$ will become zero when $\phi_L \simeq 46$ degrees. Thus for this angle of incidence there will be a substantially complete conversion of the incident longitudinal wave into a shear wave $S_1$ reflected at an angle $\phi_s=27$ degrees.

Figure 4:
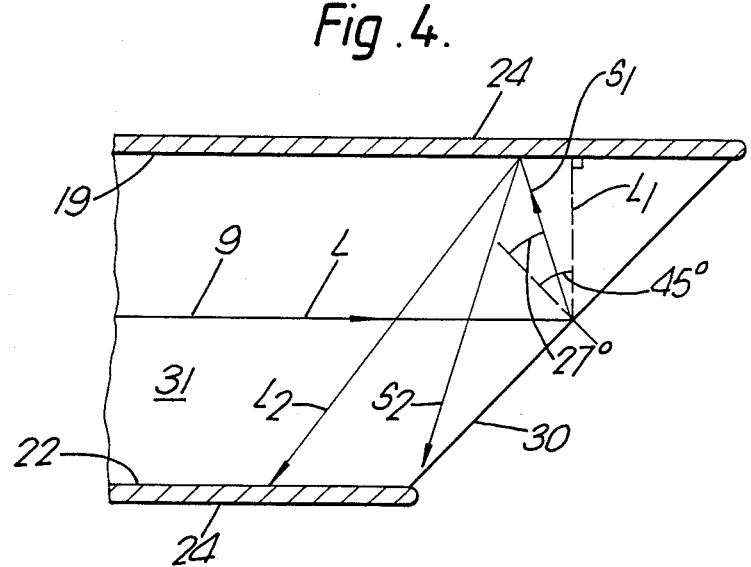
FIG. 4 is a diagrammatic longitudinal sectional detail illustrating acoustic wave paths in a simple embodiment of the invention.

FIG. 4 is a detail illustrating a simple embodiment of the invention which corresponds to the arrangement so far described with reference to FIG. 2 except that the far end face 30 of the germanium block 31 is square-cut with a wedge angle of 45 degrees. FIG. 4 is a longitudinal sectional view of the far end of the block 31 and illustrates the path taken on reflection by a longitudinal acoustic wave L propagating along the axis 9 and incident on the free boundary face 30 inclined at 45 degrees, which is approximately the angle as discussed above for which the amplitude of the reflected longitudinal wave component $L_1$ represented by a dashed line in FIG. 4, becomes zero and is therefore unable to give rise to a retroreflective echo by reflection at normal incidence with the upper side face 19 of the block.

Thus the acoustic energy is all reflected as the shear wave $S_1$ at an angle of reflection of 27 degrees. This wave will be reflected at the upper face 19 to form, in general, both shear wave and longitudinal wave components $S_2$, $L_2$, which are directed into the body of the block 31 for further reflections from the upper and lower faces 19 and 22. Since these faces are preferably loaded with an acoustic absorbing layer 24 of indium or lead, acoustic energy will be dissipated at each reflection.

Returning to the embodiment illustrated in FIG. 2, the chances of acoustic energy being returned retroactively are reduced still further by cutting the inclined end face 26 for the block 21 obliquely so that the intersections of the face 26 with the corresponding upper and lower, i.e. non-optical, side faces 19, 22, of the block are inclined to the wavefronts 7 of the acoustic wave directed along the axis 9. The plan angle between the intersection line and the wavefront is preferably 30 degrees but can lie in the range 25 degrees to 35 degrees. It should be understood that in the case of the obliquely inclined end face 26, the critical angle of incidence for which the reflected longitudinal wave amplitude becomes zero will be that measured in an oblique plane containing the incident axis 9 and the perpendicular from the face 26 at the point of incidence, and will therefore not correspond to the complement of the wedge angle measured at the optical side face 12 of 15 of the block 21.

Figure 5:
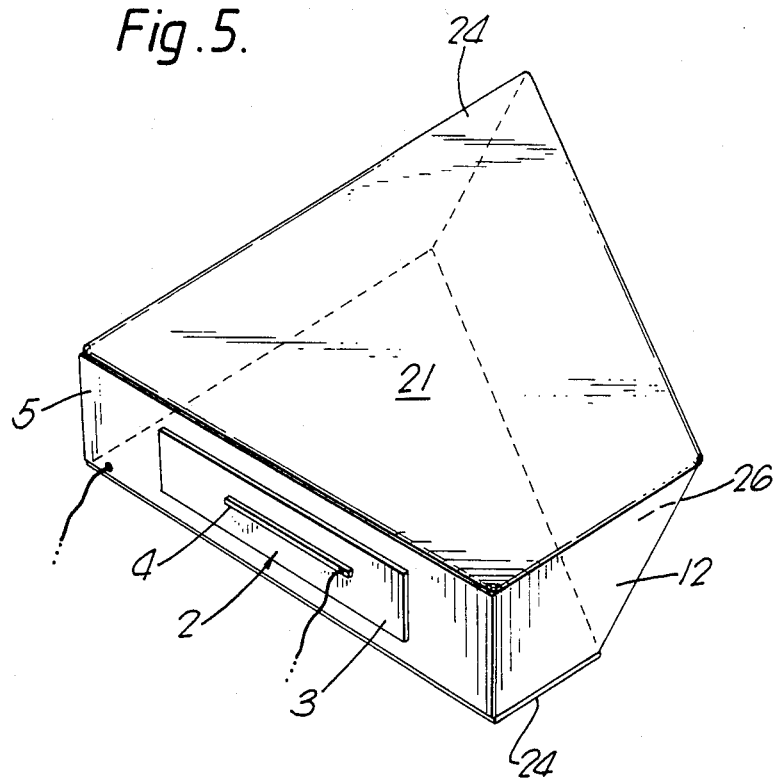
FIG. 5 is an isometric perspective view of the modulator block shown in FIG. 2.
Figure 6:
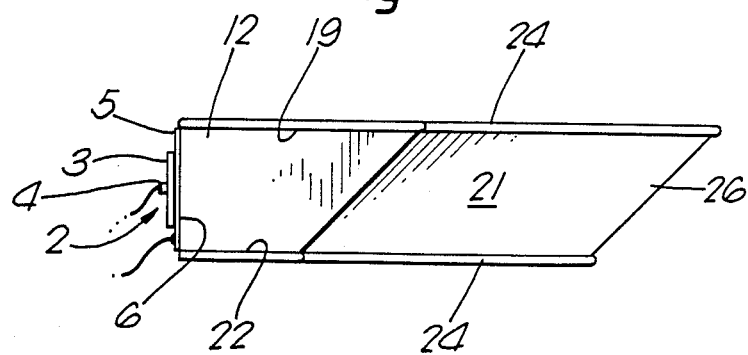
FIG. 6 is a side view of the modulator block of FIG. 3.

FIG. 5 illustrates the form of the block 21 in isometric perspective and FIG. 6 is a side view of the block 21 in the direction of the optical side face 12. It will be understood that the inclined end face 26 may equally well be cut obliquely in the other direction and can slope the other way while being equally effective in reducing the reflective return of acoustic signal energy.

In a comparison of the performance of the prior modulator employing an indium loaded inclined end face at a wedge angle of 30 degrees with that of a modulator in accordance with the invention, the former provided an attenuation of about $-55$ dB for the unwanted delayed modulation signal, while a modulator as described with reference to FIGS. 2, 5 and 6 provided an attenuation of at least $-75$ dB. Even in a case in which no acoustic absorbing layer 24 was applied to the block, an attenuation of $-62$ dB was measured.

I claim:

1. An acousto-optic modulator for modulating a beam of optical radiation by interaction with acoustic waves in an optical medium in accordance with the Bragg relationship, said modulator comprising a block of material transparent to the optical radiation to be modulated and having respective opposite side faces of optical quality to provide input and output surfaces for a beam of said optical radiation, an end face provided with electroacoustic transducer means for directing a beam of acoustic waves along a propagation axis in said block to set up an interaction region for said beam of optical radiation between said input and output surfaces, characterised in that the other end face of the block is free so as to form an optimally reflecting surface for incident acoustic waves and is inclined to the initially propagating acoustic beam incident thereon directly from the transducer, at an angle such that substantially all the acoustic energy in the incident propagation mode is converted into reflected acoustic beam energy in a different propagation mode and is directed toward at least one side face of the block in a manner which is substantially not retroreflective with respect to the initially propagating acoustic beam incident on the inclined end face of the block.

2. An acousto-optic modulator as claimed in claim 1, characterised in that the inclined end, surface is oriented obliquely relative both to the two side faces forming respectively the optical input and output surfaces, and to the other side faces.

3. An acousto-optic modulator as claimed in claim 1 or claim 2, characterised in that the side faces of the block which do not form the respective input and output faces for the beam of optical radiation are each loaded with a layer of acoustic absorbant.

4. An acousto-optic modulator as claimed in claim 3, characterised in that the acoustic absorbant is a layer of indium.

5. An acousto-optic modulator as claimed in claim 3, characterised in that the acoustic absorbant is a layer of lead.

6. An acousto-optic modulator as claimed in claim 3, in which the block is of rectangular cross section and is formed from a monocrystal of germanium and the transducer is arranged to launch a beam of longitudinal compression waves, characterised in that the crystal axes are oriented relative to the block so that the acoustic wave propagation axis is directed along the [100] crystal direction and the angle of incidence of the acoustic wave on the inclined end face lies in the range 40 degrees to 52 degrees.

7. An acousto-optic modulator as claimed in claim 6, characterised in that said angle of incidence is 46 degrees.

8. An acousto-optic modulator as claimed in claim 1, in which the block is of rectangular cross section and is formed from a monocrystal of germanium, and the transducer is arranged to launch a beam of longitudinal compression waves, characterised in that the crystal axes are oriented relative to the block so that the acoustic wave propagation axis is directed along the [111] crystal direction, the incident coherent optical radiation to be modulated is polarised so that the electric vector lies in the plane containing the acoustic and optical beam axes, and the angle of incidence of the acoustic wave on the inclined end face lies in the range 40 degrees to 52 degrees.

9. An acousto-optic modulator as claimed in claim 8, characterised in that said angle of incidence is 46 degrees.

10. An acousto-optic modulator as claimed in claim 1, in which the cross section of the block is rectangular, characterised in that the intersection edges of the inclined end face and the respective side faces which do not form the input and output surfaces for the optical radiation beam, are inclined to a line parallel to the transducer end face at an angle in the range 25 degrees to 35 degrees.

11. An acousto-optic modulator as claimed in claim 10, characterised in that said angle of inclination is 30 degrees.

12. An acoustooptic modulator for modulating a beam of optical radiation, said modulator comprising:
   a block of material transparent to the optical radiation to be modulated, said block having first and second end faces and first and second side faces;
   electroacoustic transducer means arranged at the first end face, said transducer means producing a beam of acoustic waves having a first propagation mode in the block, said acoustic wave propagating from the first end face along a propagation axis to the second end face; and
   optical source means for producing a beam of optical radiation incident on the first side face of the block, said optical radiation beam propagating from the first side face to the second side face, said optical radiation beam intersecting the beam of acoustic waves at an interaction region in the block;
   characterized in that:
   the second end face of the block is substantially free to reflect acoustic waves incident thereon; and
   the second end face of the block is arranged at an angle with respect to the propagation axis of the acoustic waves such that the reflected acoustic waves will have substantially completely a second propagation mode different from the first propagation mode, and such that the reflected acoustic waves substantially do not interfere with the beam of acoustic waves in the interaction region.

13. An acoustooptic modulator as claimed in claim 12, characterized in that:
   the block has third and fourth side faces transverse to the first and second side faces; and
   the second end face is arranged obliquely to the first, second, third, and fourth side faces.

14. An acoustooptic modulator as claimed in claim 13, further comprising a layer of acoustic absorbant material on the third side face, and another layer of acoustic absorbant material on the fourth side face.

15. An acoustooptic modulator as claimed in claim 14, characterized in that the angle between the propagation axis and the second end face lies in the range of 40 to 52 degrees.

16. An acoustooptic modulator as claimed in claim 15, characterized in that the angle between the propagation axis and the second end face is appoximately 46 degrees.

17. An acoustooptic modulator as claimed in claim 15, characterized in that the angle between the third side face and the second end face lies in the range of 25 to 35 degrees.

18. An acoustooptic modulator as claimed in claim 17, characterized in that the angle between the third side face and the second end face is approximately 30 degrees.

* * * * *